(12) United States Patent
Gupta (10) Patent No.: US 11,449,845 B2
(45) Date of Patent: Sep. 20, 2022

(54) AUGMENTED REALITY (AR)-ASSISTED SMART CARD FOR SECURE AND ACCURATE REVISION AND/OR SUBMISSION OF SENSITIVE DOCUMENTS

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 203 days.

(21) Appl. No.: 16/896,478

(22) Filed: Jun. 9, 2020

(65) Prior Publication Data
US 2021/0383338 A1    Dec. 9, 2021

(51) Int. Cl.
| | |
|---|---|
| *G06Q 20/10* | (2012.01) |
| *G06Q 10/10* | (2012.01) |
| *G06Q 20/04* | (2012.01) |
| *G06Q 40/02* | (2012.01) |
| *G06Q 20/34* | (2012.01) |
| *G06Q 20/40* | (2012.01) |
| *G07F 19/00* | (2006.01) |
| *G06V 30/412* | (2022.01) |
| *G06F 21/62* | (2013.01) |
| *G06V 30/40* | (2022.01) |

(52) U.S. Cl.
CPC .......... *G06Q 20/108* (2013.01); *G06Q 10/10* (2013.01); *G06Q 20/042* (2013.01); *G06Q 20/341* (2013.01); *G06Q 20/352* (2013.01); *G06Q 20/4037* (2013.01); *G06Q 40/02* (2013.01); *G06V 30/412* (2022.01); *G07F 19/00* (2013.01); *G06F 21/6245* (2013.01); *G06V 30/43* (2022.01)

(58) Field of Classification Search
CPC .... G06Q 20/108; G06Q 10/10; G06Q 20/042; G06Q 20/341; G06Q 20/352; G06Q 20/4037; G06Q 40/02; G06V 30/412; G06V 30/43; G06V 10/17; G07F 19/00; G06F 21/6245; G06F 21/34
See application file for complete search history.

(56) References Cited

U.S. PATENT DOCUMENTS

| | | | |
|---|---|---|---|
| 7,419,091 B1* | 9/2008 | Scanlon | G07F 19/203 235/379 |
| 10,229,100 B1* | 3/2019 | Lesner | G06F 40/174 |

(Continued)

*Primary Examiner* — William A Beutel
(74) *Attorney, Agent, or Firm* — Weiss & Arons LLP (57) ABSTRACT

Systems and methods for an augmented reality (AR)-assisted smart card for secure and accurate revision and/or submission of sensitive documents are provided. The methods may be executed via computer-executable instructions running on a microprocessor embedded in the smart card. A method may include capturing an image of a document, processing the image of the document, and computing, for one or more of the fields of the document, a recommended input. The method may further include comparing, for the one or more fields, the recommended input with an actual input, and, when the recommended input is more than a threshold difference apart from the actual input, generating a recommended revision. The method may also include displaying an AR image of the document on a display screen that is embedded in the smart card, said AR image comprising the image of the document augmented with the recommended revisions.

2 Claims, 9 Drawing Sheets

(56) References Cited

U.S. PATENT DOCUMENTS

| | | | |
|---|---|---|---|
| 10,552,525 B1* | 2/2020 | Allison | G06Q 10/10 |
| 11,055,683 B1* | 7/2021 | Bartholomew | G06Q 20/341 |
| 2002/0138424 A1* | 9/2002 | Coyle | G06Q 20/28 |
| | | | 705/39 |
| 2005/0283726 A1* | 12/2005 | Lunati | G06F 40/232 |
| | | | 715/265 |
| 2016/0049010 A1* | 2/2016 | Hinski | G06T 19/006 |
| | | | 345/633 |
| 2017/0289127 A1* | 10/2017 | Hendrick | H04W 12/065 |
| 2018/0096324 A1* | 4/2018 | Chen | G06Q 20/386 |
| 2019/0286805 A1 | 9/2019 | Law et al. | |

* cited by examiner

AUGMENTED REALITY (AR)-ASSISTED SMART CARD FOR SECURE AND ACCURATE REVISION AND/OR SUBMISSION OF SENSITIVE DOCUMENTS

FIELD OF TECHNOLOGY

Aspects of the disclosure relate to computer systems. Specifically, aspects of the disclosure relate to systems and methods for specialized smart payment instruments.

BACKGROUND OF THE DISCLOSURE

Personal bank checks and other sensitive financial documents are filled out and submitted by millions of users every day across the globe. The documents are frequently filled out with errors and omissions. The errors and omissions can lead to erroneous or fraudulent execution of transactions. Typical document completion and submission is thus inefficient and insecure.

Moreover, a user filling out and submitting a sensitive financial document will often visit a physical branch of a financial institution to receive assistance in ensuring accurate completion and submission of the documents. This is inefficient and inconvenient for the user and can introduce harmful delays when the document submission is time sensitive.

It would be desirable, therefore, to provide systems and methods for a platform for secure and accurate revision and submission of sensitive financial documents. It would be further desirable for the platform to be convenient for a user to deploy remotely.

SUMMARY OF THE DISCLOSURE

Aspects of the disclosure relate to an augmented reality (AR)-assisted platform for secure and accurate revision and/or submission of sensitive documents. The platform may include a smart card. The smart card may include a microprocessor, a display screen, a camera, and a power source for the microprocessor, the display screen, and the camera.

The smart card may also include a wireless communication element configured to provide wireless communication between the smart card and a central system. The smart card may also include a non-transitory memory storing computer-executable instructions, that, when run on the microprocessor, are configured to perform some or all the disclosed features of the platform.

The smart card may be configured to capture an image of a document via the camera. The document may include a plurality of fields. The smart card may also be configured to process the image of the document via an image processing module and/or a text processing module. The smart card may be configured to compute, for one or more of the fields, a recommended input.

The smart card may be configured to compare, for the one or more fields, the recommended input with an actual input. When the recommended input is more than a threshold difference apart from the actual input, the smart card may be configured to generate a recommended revision. The smart card may also be configured to display an AR image of the document on the display screen. The AR image may include the image of the document augmented with the recommended revisions.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

An augmented reality (AR)-assisted platform for secure and accurate revision and/or submission of sensitive documents is provided. AR may include technologies that are configured to augment actual reality, e.g., an actual image or view, with a virtual component, such as digitally generated content.

The platform may include a payment instrument configured to perform the revision and submission. The payment instrument may, in certain preferred embodiments, be a smart card. The smart card may include a microprocessor, a display screen, and a camera. The smart card may be configured to leverage AR technology to securely and accurately revise and/or submit the sensitive documents.

The smart card may include a housing comprised of metal and/or plastic. The card may at least partially resemble a typical debit or credit card. The card may have dimensions that conform to the ISO/IEC 7810 ID-1 standard. The dimensions may, in some embodiments, be no greater than 86 millimeters×54 millimeters×0.8 millimeters.

The smart card may also include a wireless communication element configured to provide wireless communication between the smart card and a central system. The smart card may also include a non-transitory memory storing computer-executable instructions, that, when run on the microprocessor, are configured to perform some or all the disclosed features of the platform.

In certain embodiments of the platform, the wireless communication element may include a nano wireless network interface card ("NIC"). The wireless communication element may include any suitable component capable of facilitating wireless communication.

The smart card may also include a power source for the microprocessor, the display screen, and the camera. In some embodiments, the power source may be rechargeable. The power source may recharge via solar energy. The power source may recharge via inductive charging, e.g., with a wireless recharging mechanism. The power source may recharge via a charging port. A charging port may include mini or micro Universal Serial Bus (USB) connectors, or any other suitable connector. The power source may recharge via any other suitable charging mechanism.

In some embodiments, the microprocessor, the camera, the power source, the wireless communication element, and/or the memory may be embedded in the card. The display screen may be affixed to the card and may be viewable on a surface of the card. In some preferred embodiments, the camera may be installed so that the lens is directed out of the rear of the card. In other embodiments, the camera lens may face forward.

The smart card may be configured to capture an image of a document via the camera. Exemplary documents may include a personal bank check, a form to execute a transaction, or any other suitable document, financial or otherwise. The bank check or other document may be associated with a user of the smart card. For example, the user may be filling out a check to transfer money to a recipient. In some scenarios, the document may originate from elsewhere. For example, the document may be a check written by an outside party and the user of the smart card may be the recipient of the check. The user may be using the smart card to deposit the check.

The document may include a plurality of fields. Exemplary fields include a name field, an account number field, a date field, an address field, a monetary amount field, a signature field, or any other suitable field that may be filled in with suitable information for the document.

The smart card may also be configured to process the image of the document via an image processing module and/or a text processing module. The smart card may be configured to compute, for one or more of the fields, a recommended input.

The smart card may be configured to compare, for the one or more fields, the recommended input with an actual input. When the recommended input is more than a threshold difference apart from the actual input, the smart card may be configured to generate a recommended revision. The smart card may also be configured to display an AR image of the document on the display screen. The AR image may include the image of the document augmented with the recommended revisions.

In some embodiments of the platform, when no recommended revisions are generated, the smart card may be configured to submit the document to the central system via the wireless communication element.

In certain embodiments, the smart card may be configured to virtually create a revised document. The revised document may be based on the AR image of the document. The smart card may be further configured to submit the revised document to the central system via the wireless communication element.

The platform may, in some embodiments, further include a microphone embedded in the smart card. The platform may also include a tactile sensor embedded in the smart card. The platform may be configured to authorize a revision and/or a submission of the document via an input received by the microphone and/or the tactile sensor.

In certain embodiments, authorizations or other instructions may be audible. The smart card may receive the instructions via the microphone. The smart card may process the instructions via voice recognition software.

In some embodiments, the instructions may be received via a tactile sensor. The tactile sensor may include a keypad that is separate from the display screen. In other embodiments, the tactile sensor may be a part of the display screen, and the display screen may be augmented to be a touchscreen.

In certain embodiments of the platform, the smart card may be configured to verify information in the document. For example, the smart card may be configured to verify a monetary amount that is in the monetary amount field. To verify the monetary amount, the smart card may be configured to query the central system, via the wireless communication element, for an account balance associated with the smart card. When the monetary amount is greater than a predetermined maximum amount (a maximum amount may, for example, be a threshold amount below the account balance), the recommended revision generated for the monetary amount field may include the maximum amount and/or a message indicating the account balance. When the monetary amount field is blank, the recommended revision generated for the monetary amount field may include a message indicating the account balance.

In some embodiments, the smart card may verify other information. For example, the smart card may compare the name, address, signature, or other information contained in the document. Verifying the information may include accessing information from a user profile. The user profile may be associated with, and may be stored at, a central system. The central system may be associated with a financial institution such as a bank.

In some embodiments the smart card may display a warning message when the information is inconsistent with the user profile, or is otherwise not verified. In certain embodiments, when information in the document is verified, the smart card may display a message stating as such. The smart card may provide the user with an option to authorize submission of the document via the smart card.

An augmented reality (AR)-assisted method for securely and accurately revising and/or submitting sensitive documents is provided. The method may be executed via computer-executable instructions that are stored in a non-transitory memory of a smart card and run on a microprocessor embedded in the smart card.

The method may include capturing, via a camera that is embedded in the smart card, an image of a document. The document may be a sensitive document. The document may be a financial document. Exemplary documents may include a personal bank check, a form to execute a transaction, or any other suitable document.

The document may include a plurality of fields. Exemplary fields may include a name field, an account number field, a date field, an address field, a monetary amount field, a signature field, or any suitable field for informational input.

The method may include processing the image of the document via an image processing module and/or a text processing module. The method may also include computing, for one or more of the fields, a recommended input. The method may further include comparing, for the one or more fields, the recommended input with an actual input. When the recommended input is more than a threshold difference apart from the actual input, the method may include generating a recommended revision.

The method may include displaying an AR image of the document on a display screen that is embedded in the smart card. The AR image may include the image of the document augmented with the recommended revisions.

In some embodiments, when no recommended revisions are generated, the method may further include submitting the document to a central system via a wireless communication element.

In certain embodiments, the method may include virtually creating a revised document. The revised document may be based on the AR image of the document. The method may also include submitting the revised document to a central system via a wireless communication element.

In some embodiments, the method may also include authorizing a revision of the document and/or a submission of the document. Authorization may be implemented via an input received by a microphone embedded in the smart card and/or by a tactile sensor embedded in the smart card.

The method may, in certain embodiments, include verifying a monetary amount in the monetary amount field. Verifying the amount may include querying a central system, via a wireless communication element, for an account balance associated with the smart card. When the monetary amount is greater than a maximum amount (the maximum amount may, for example, be a threshold amount below the account balance) the recommended revision generated for the monetary amount field may include the maximum amount and/or a message indicating the account balance. When the monetary amount field is blank, the recommended revision generated for the monetary amount field may include a message indicating the account balance.

Security, accuracy, and efficiency associated with revising and submitting sensitive documents are thus improved. Security may be increased by reducing errors and omissions in the documents, thereby facilitating transactions with increased security and accuracy. Security may also be increased by providing a platform with dedicated transactional hardware, software, and/or communication channels. Such a platform may be associated with a decreased risk of infection with malware, spyware, or other security risk factors.

Efficiency may thereby be increased by enabling a user to perform the revision and submission remotely at the location of his or her convenience. Efficiency may also be increased by eliminating the need to use a device external to a dedicated payment instrument to perform the revision and/or submission.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
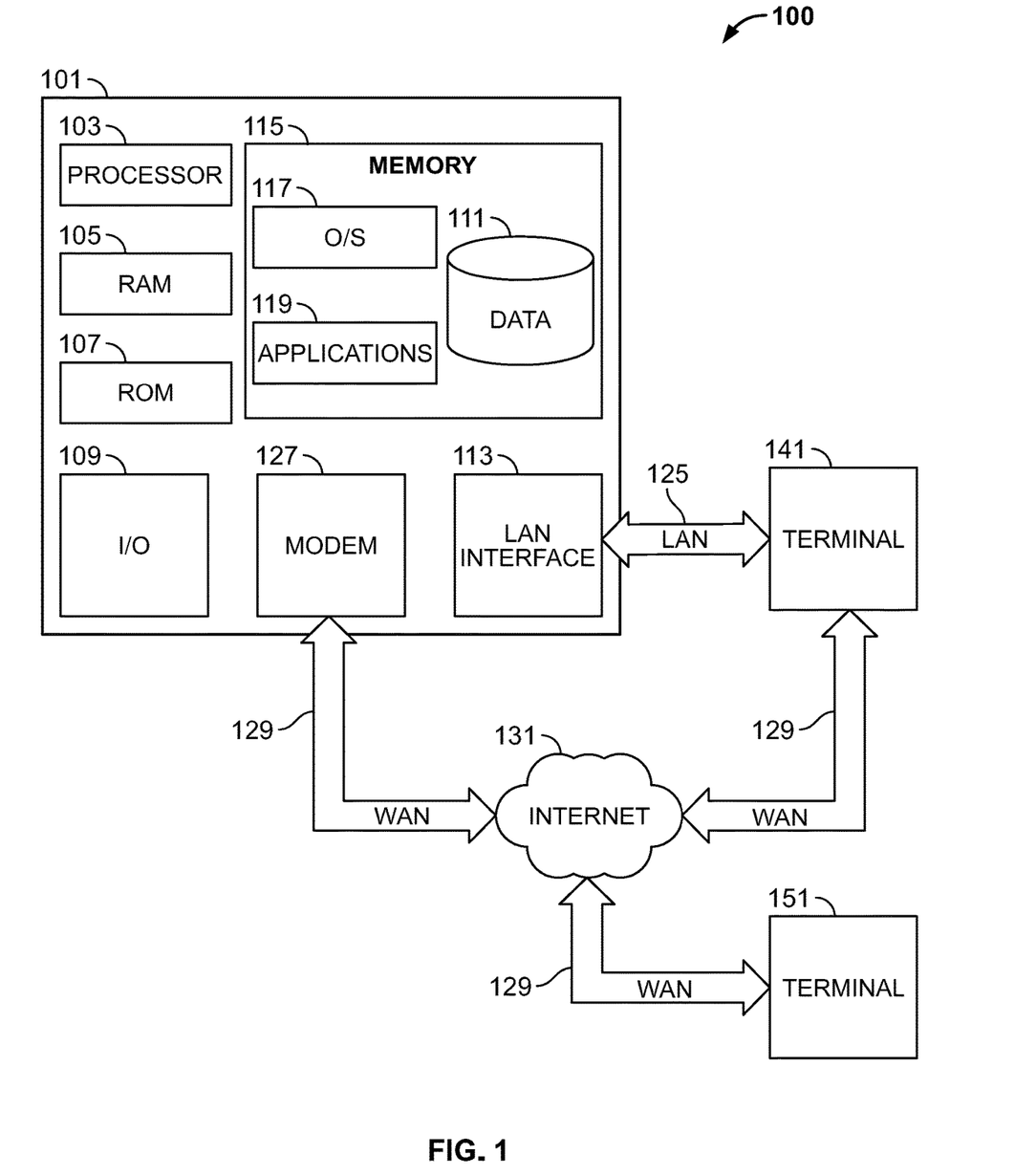
FIG. 1 shows an illustrative system in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to document revision and submission. The input/output module may also include one or more speakers for providing audio output and a video display device for providing textual, audio, audiovisual, and/or graphical output. The input and output may be related to document revision and submission.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to document revision and submission.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
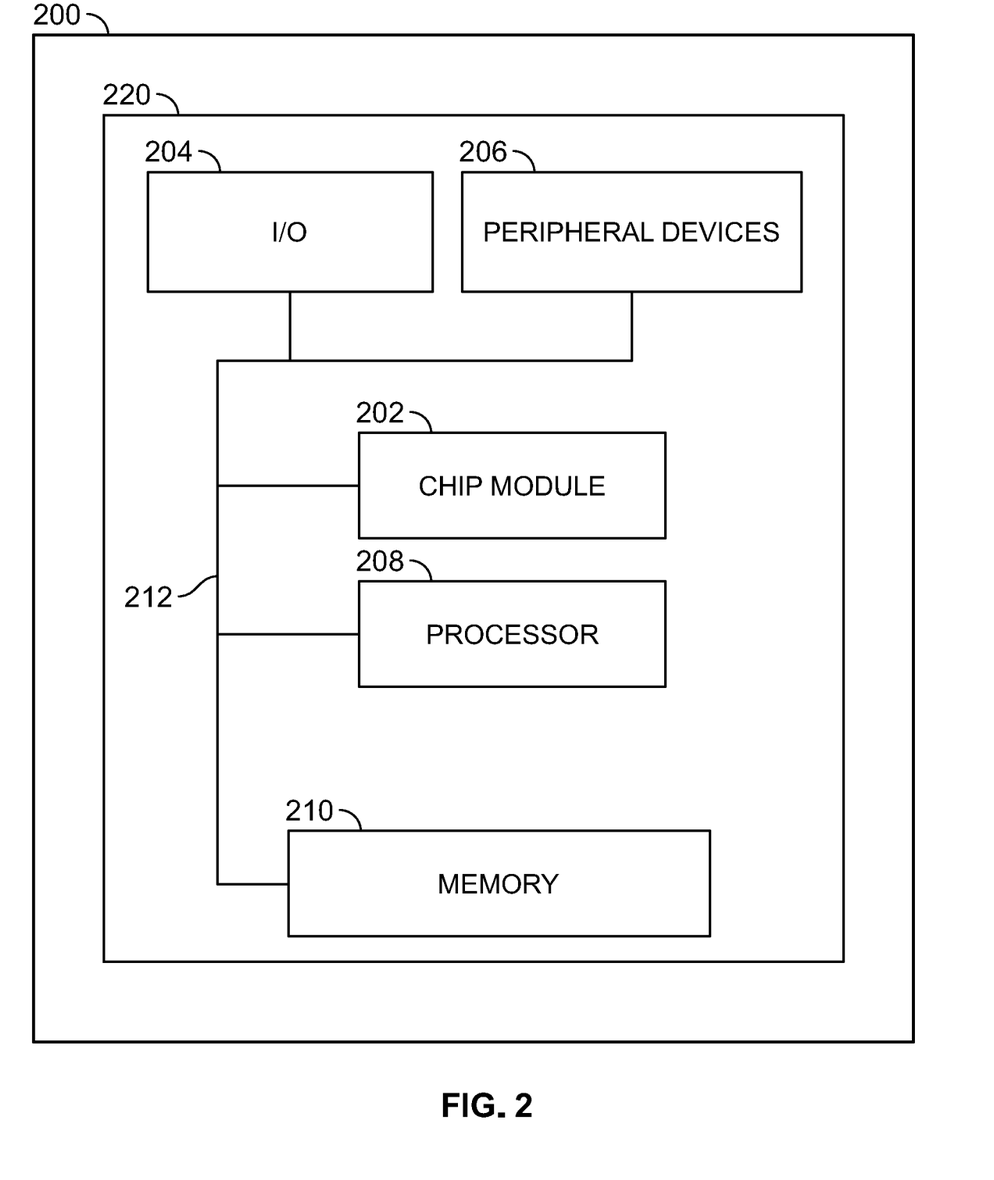
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
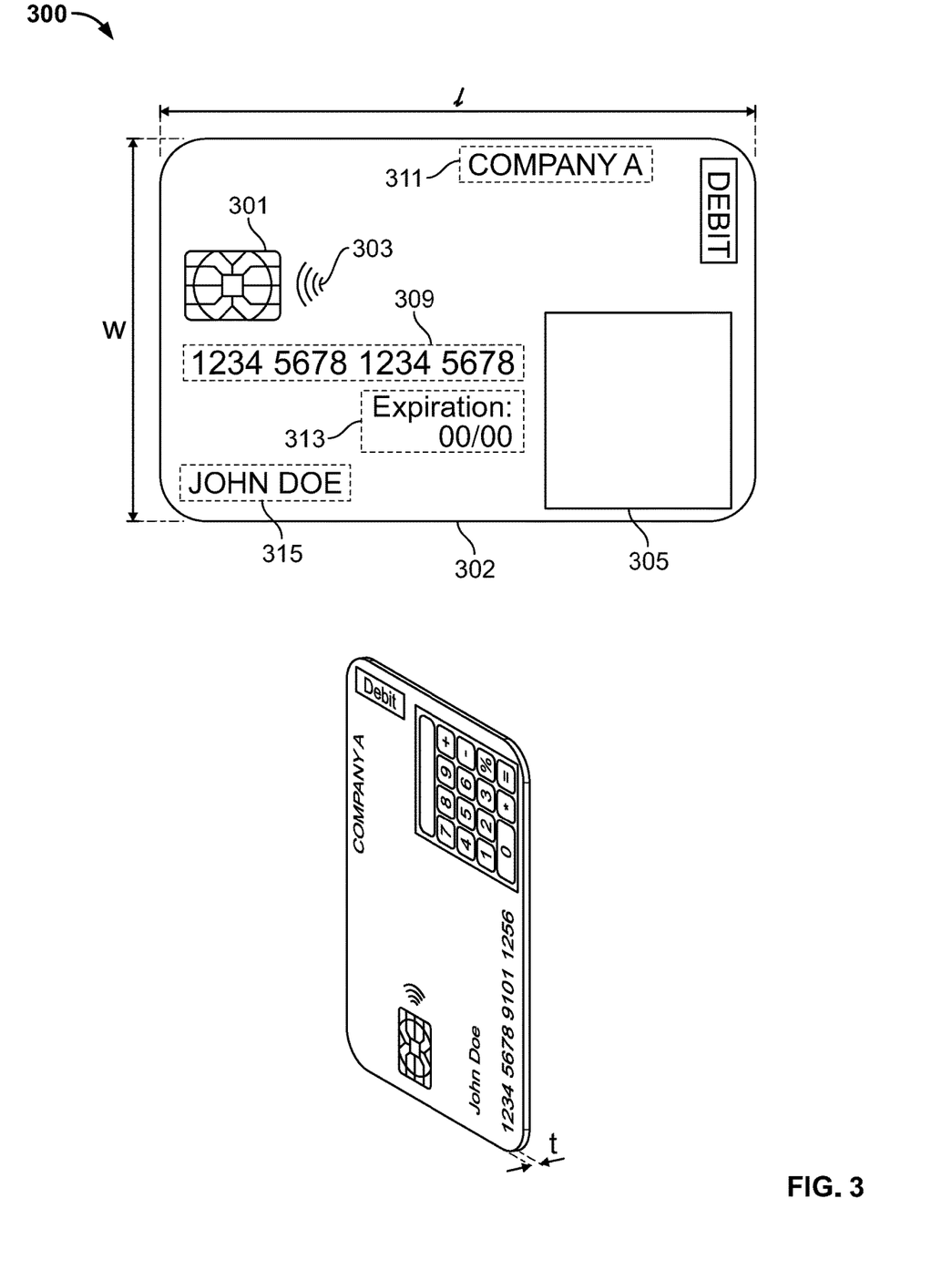
FIG. 3 shows another illustrative apparatus in accordance with principles of the disclosure.

FIG. 3 shows an exemplary payment instrument, illustrative smart card 300, according to aspects of the disclosure. Smart card 300 includes display screen 305. Display screen 305 may be any suitable size. For example, display screen may be larger than the size shown in FIG. 3. Display screen 305 may be used by smart card 300 to display information. The information may include an augmented image of a document. The augmented image may be augmented with recommended revisions. Display screen 305 may, in some embodiments, be a touchscreen configured to receive instructions and/or authorizations.

Smart card 300 includes a microprocessor and other components for capturing and storing information entered by a user. Smart card 300 may, in certain embodiments, be configured to encrypt the information. Smart card 300 may also include executable instructions for packaging information entered via keypad 305 into revision, authorization, submission, or other suitable instructions (which may be referred to herein as requests) associated with the document.

FIG. 3 shows that smart card 300 includes chip 301. Chip 301 may provide an electrical contact that is accessible through housing 302. Chip 301 may provide an electrical contact for establishing a wired or contact based communication channel with an ATM or POS terminal when card 300 is inserted into a card reader of the ATM or POS terminal. Chip 301 may be an EMV chip. Chip 301 may facilitate charging of one or more components of smart card 300.

Chip 301 may store a copy of information printed on a face of smart card 300. For example, chip 301 may store account number 309, user name 315, expiration date 313 and issuing bank 311. Chip 301 may also store encrypted security information. The encrypted security information may be utilized to provide a "second factor" method of authentication prior to triggering execution of instructions.

For example, smart card 300 may package information entered by user 315 into instructions. The instructions may include a PIN associated with smart card 300. The instructions may be submitted for execution to a transaction gateway or other suitable centralized system without requiring any further input from user 315. The instructions may be transmitted using wireless circuitry 303. In some embodiments, the instructions may be transmitted via wired communication with chip 301.

After instructions are received by a transaction gateway or other system, the system may, in certain embodiments, first verify that the PIN included in the instructions is associated with smart card 300. For example, the transaction gateway may communicate with a remote payment processing server operated by the issuer and determine whether the received PIN is associated with user name 315 and/or account number 309.

As a second factor method of authentication, the transaction gateway may determine whether the PIN included in the transaction instructions successfully unlocks encrypted security information stored on chip 301. If the PIN successfully unlocks the encrypted security information, the transaction gateway may execute the received transaction instructions.

Smart card 300 may be any suitable size. FIG. 3 shows that smart card 300 has width w and length l. For example, width w may be 53.98 millimeters ("mm"). Length 1 may be 85.60 mm. Smart card 300 has thickness t. An illustrative thickness t may be 0.8 mm. An exemplary form factor of smart card 300 may be 53.98 mm×85.60 mm×0.8 mm. Such an exemplary form factor may allow smart card 300 to conveniently fit into a user's wallet or pocket. This exemplary form factor may allow smart card 300 to fit into a card reader of an ATM or POS terminal.

Figure 4A:
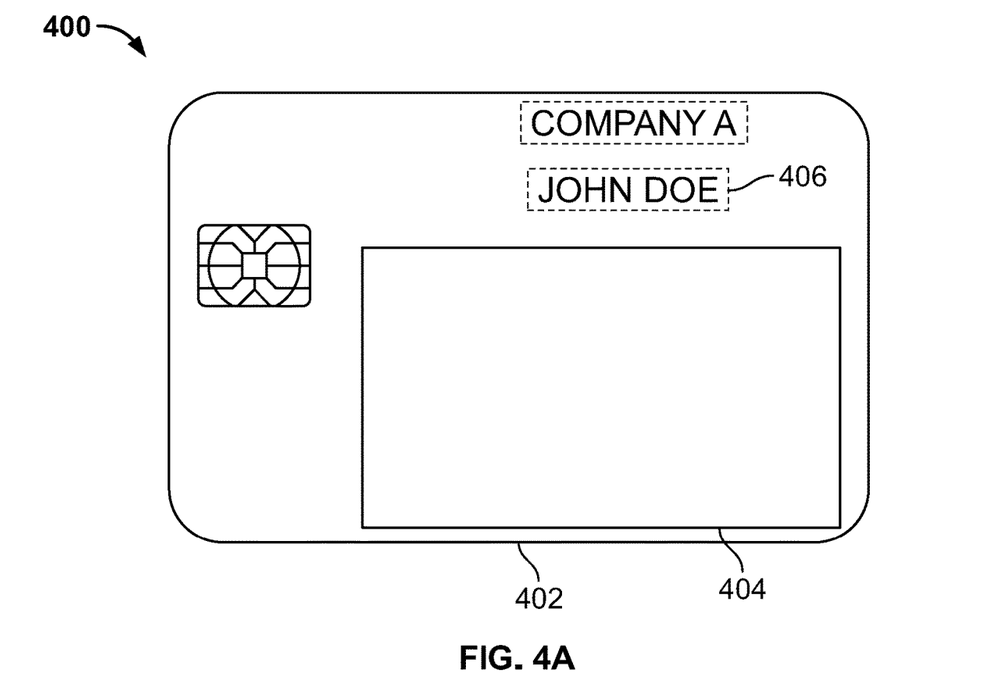
FIGS. 4A and 4B show yet another illustrative apparatus in accordance with principles of the disclosure.
Figure 4B:
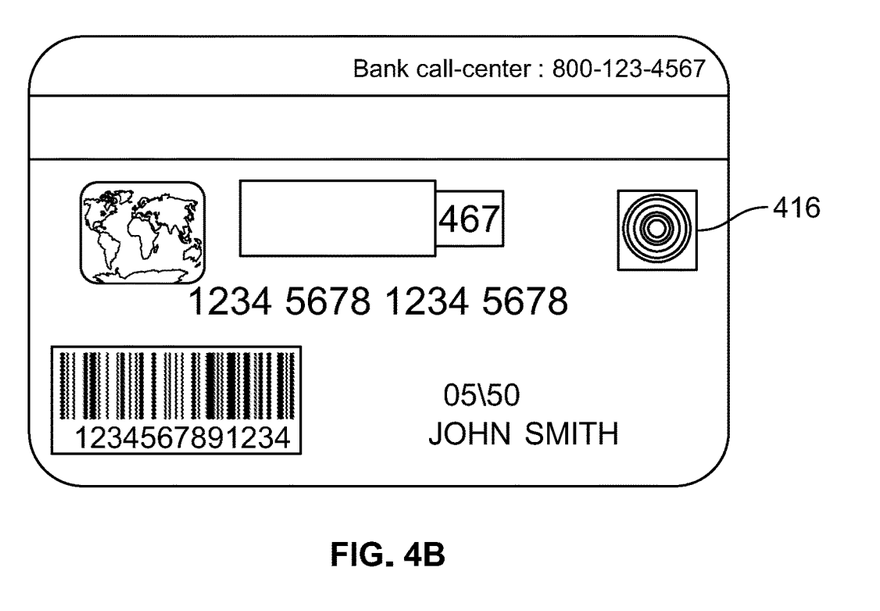

FIGS. 4A and B show illustrative apparatus configured according to aspects of the disclosure. FIG. 4A shows front view 400 of exemplary smart card 402. Smart card 402 may include many of the features of smart card 300. Smart card 402 includes display screen 404. Display screen 404 may preferably take up a large portion of the space on the front of the card. This may increase the viewability of images displayed on the screen, thereby increasing the functionality of revising and submitting sensitive documents via smart card 402. An account number may be located in any suitable location on the face of smart card 402, e.g., in place of name 406. In other embodiments, the account number may be located on the rear of the card.

FIG. 4B shows a back view of a smart card. The smart card may be substantially similar to smart card 402. The back view shows that the smart card incorporates a camera. Lens 416 of the camera may preferably face out of the rear of the card. A rear-facing camera may be more useful in providing a seamless document revision experience by capturing images of documents behind the card while augmented images may be displayed on the screen on the front of the card.

Figure 5:
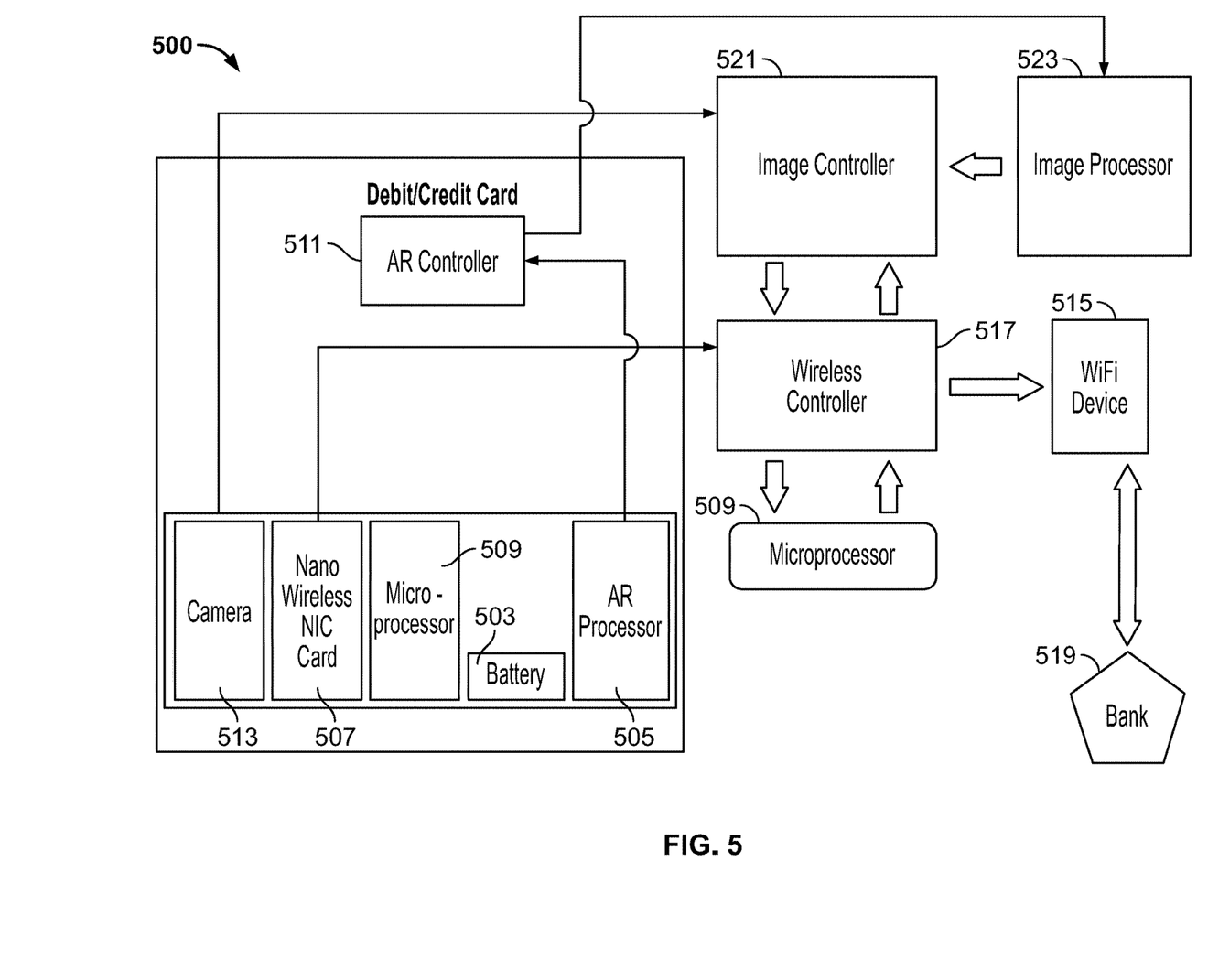
FIG. 5 shows an illustrative system architecture in accordance with principles of the disclosure.

FIG. 5 shows exemplary system architecture including smart card 500 according to aspects of the disclosure. Smart card 500 may include one or more features of smart cards 300 or 402. Smart card 500 includes augmented reality (AR) controller 511. AR controller 511 may control administration of data captured by camera 513 and processed by AR processor 505. AR controller 511 may perform in conjunction with image controller 521 and image processor 523. The controllers and processors may receive an original image, process the image, generate recommended revisions, and create an augmented image by merging the original image with the recommended revisions.

Smart card 500 includes microprocessor 509 which may control overall operation of smart card 500 and its associated components. For example, microprocessor 509 may control operation of nano network interface controller (NIC) card 507, wireless controller 517, and communication via WIFI device 515.

Smart card 500 may thus be configured to capture images of a document, calculate recommended revisions, generate an augmented image incorporating the recommended revisions, display the augmented image on a screen, and receive instructions to revise, submit, or perform a transaction based on the document.

Figure 6:
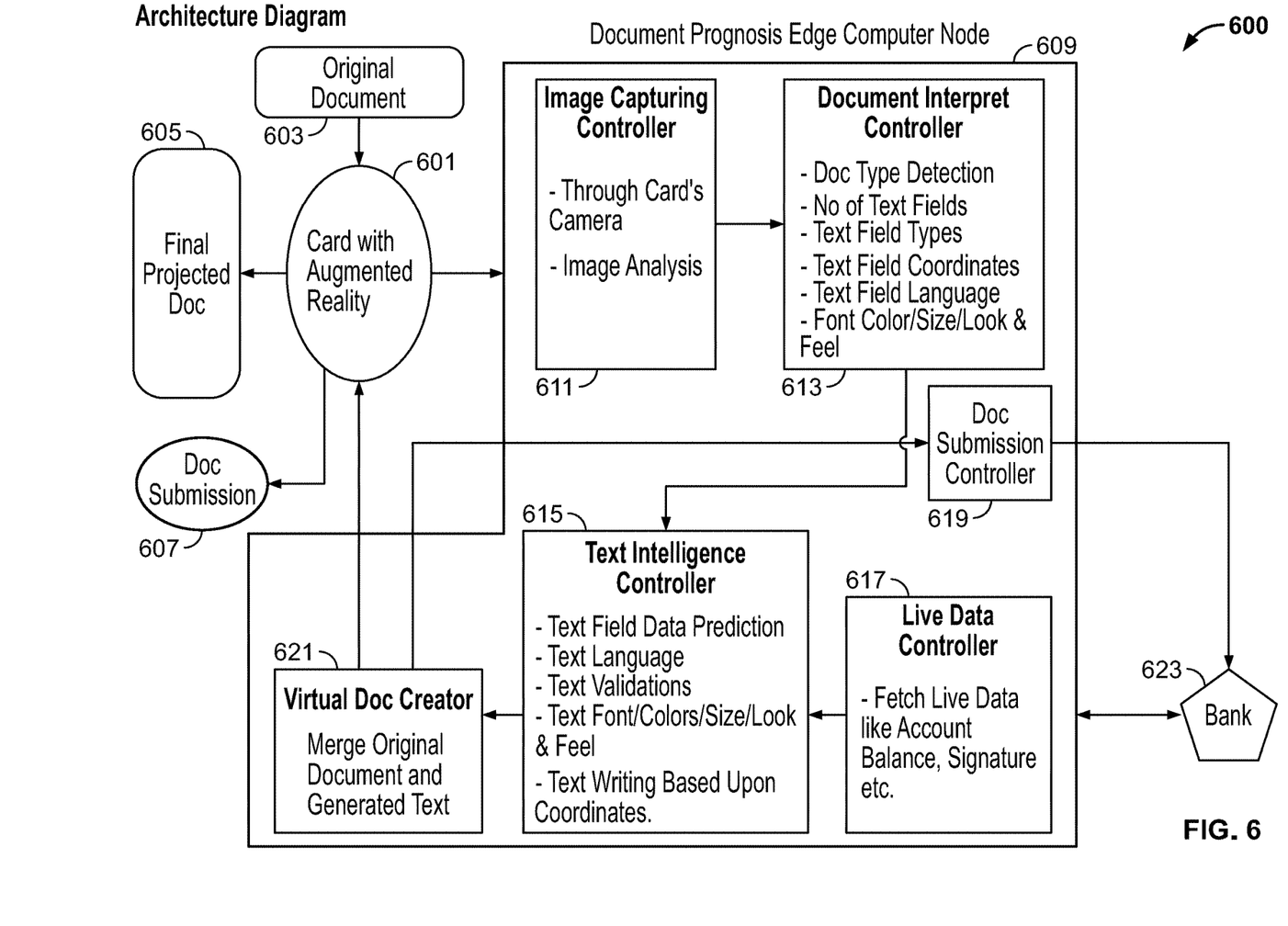
FIG. 6 shows another illustrative system architecture in accordance with principles of the disclosure.

FIG. 6 shows exemplary system architecture 600 according to aspects of the disclosure. Architecture 600 includes AR card 601. AR card 601 may be similar to smart cards 500, 300, and 402. AR card 601 may be configured to capture an image of original document 603. Original document 603 may be a sensitive financial document such as a personal bank check.

Capture of original document 603 may include image capturing controller 611. The capture may be accomplished via a camera embedded in the card. The document may be analyzed via document interpretation controller 613. Document interpretation controller 613 may detect the document type, the number of text fields contained in the document, the type of each text field, coordinates of each text field, a language of the document and/or of each text field, and a font color or type appropriate for each text field.

Text intelligence controller 615 may build upon the analysis of document interpretation controller 613 to generate recommended revisions. The recommended revisions may be based, at least in part, upon information retrieved via live data controller 617 from a central system. The central system may be a financial institution such as bank 623. The information may include account numbers, account balance, name, address, signature profile, or other suitable information that may be useful for completing sensitive forms.

Based on the recommended revisions generated by text intelligence controller 615, virtual document creator 621 may merge the image of original document 603 with the recommended revisions to create an augmented image 605.

Creating augmented image 605 may use AR technology. Augmented image 605 may be displayed on a screen of AR card 601. A user may use augmented image 605 as a template for revising the document by hand, which may again be captured by AR card 601. When AR card 601 generates no (or, in some embodiments, minimal) revisions, AR card 601 may be configured to submit the documents. In certain embodiments AR card 601 may be configured to incorporate the recommended revisions digitally to produce a digitally revised document ready for submission. Document submission 607 may utilize document submission controller 619, and the submission may be transmitted to bank 623.

FIGS. 7A-7E show illustrative apparatus in conjunction with sensitive documents in accordance with principles of the disclosure.

Figure 7A:
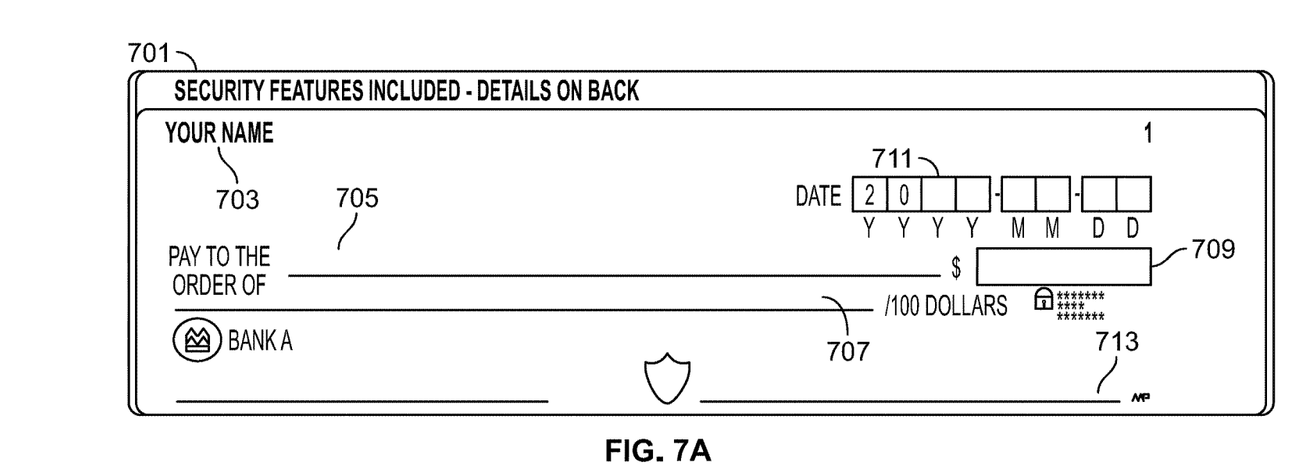
FIGS. 7A-7F show illustrative apparatus in conjunction with sensitive documents in accordance with principles of the disclosure.

FIG. 7A shows an exemplary sensitive document 701. Document 701 may be a personal bank check. The check may contain multiple text fields. The text fields may include name field 703, payment recipient field 705, amount field (text-based 707 and/or number-based 709), date field 711, and signature field 713. The text fields may be blank in an original state of document 701 shown in FIG. 7A.

Figure 7B:
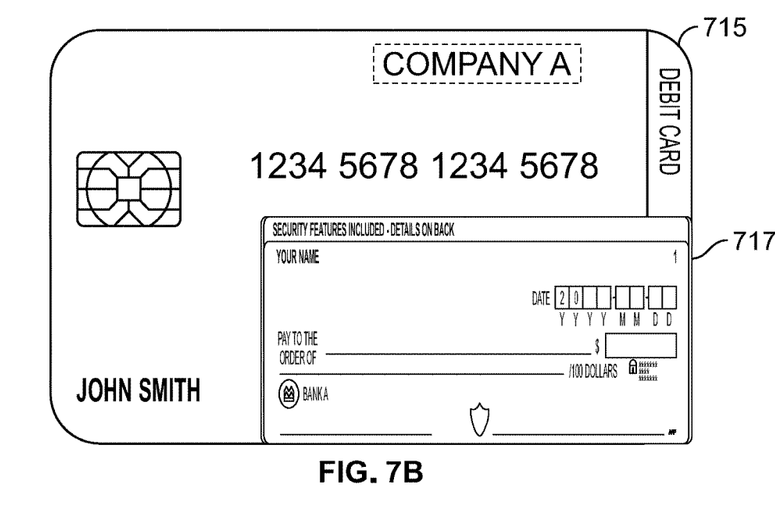

FIG. 7B shows exemplary smart card 715 with an image of the sensitive document from FIG. 7A displayed on screen 717. The image shows that the text fields are blank.

Figure 7C:
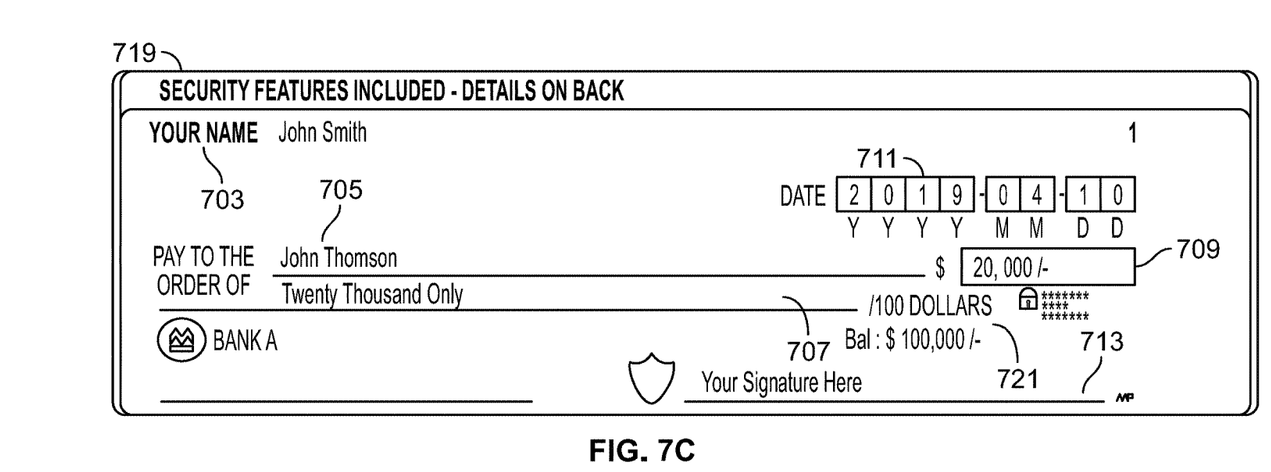
Figure 7D:
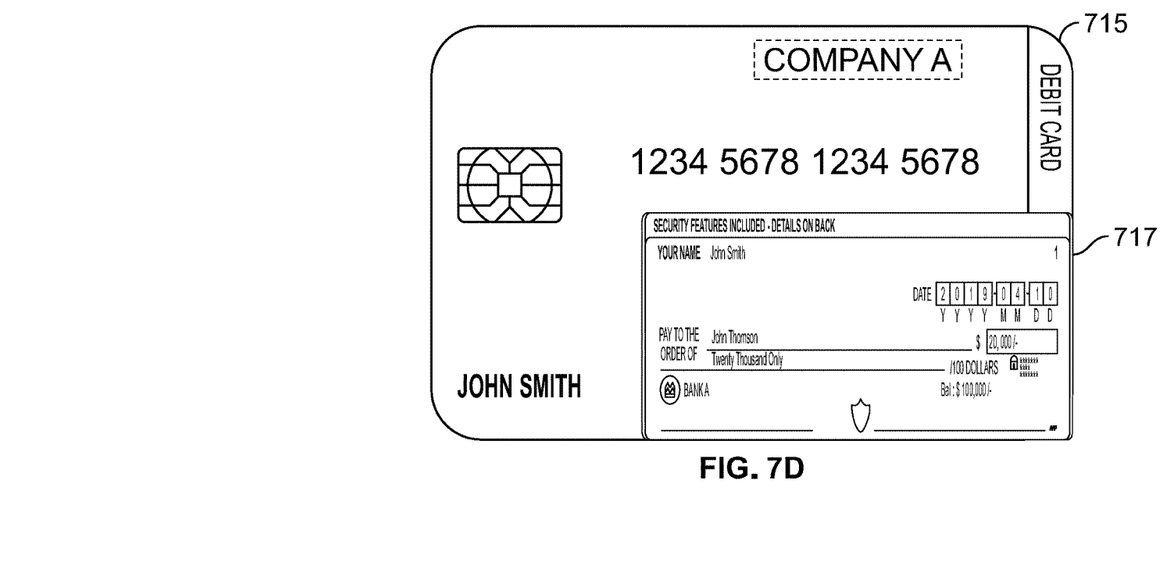

FIG. 7C shows exemplary augmented image 719. FIG. 7D shows the smart card displaying the augmented image on a screen. Augmented image 719 may be based on a merging of the original image of document 701 from FIG. 7A together with recommended revisions generated by smart card 715. Recommended revisions may include a recommendation to fill out the name field with the name of the account holder, the date field with the current date, and the signature field with a signature from an account profile. The recommendations may be informative messages (i.e., "fill out your name" or "sign here"). The recommendations may be actual revisions (i.e., "John Smith" in the name field, or an actual signature in the signature field).

Recommended revisions may also include a recipient and amount. The recipient and amount may be generated based on an artificial intelligence (AI) or machine learning (ML) algorithm. The algorithm may be based on historical logs of payments associated with the user's account. In some embodiments, the recommended revisions for the amount may be based on an account balance. For example, the smart card may display an account balance to inform the user of a "not-to-exceed," or maximum, amount 721. In some embodiments, recommended revisions that are correcting an error may be displayed in one color and recommended revisions that are informational (e.g., a message displaying an account balance) may be another color. For example, a corrective message may be red and an informational message may be green.

In some embodiments, the smart card may only generate a recommended revision for the amount field when the amount in the field exceeds a maximum amount. The maximum amount may be a predetermined amount. The maximum amount may be a monetary amount, e.g., $10 k below the account balance. As another example, the maximum amount may be a percentage, e.g., 80% of the account balance. The maximum amount may be customizable by the user.

Figure 7E:
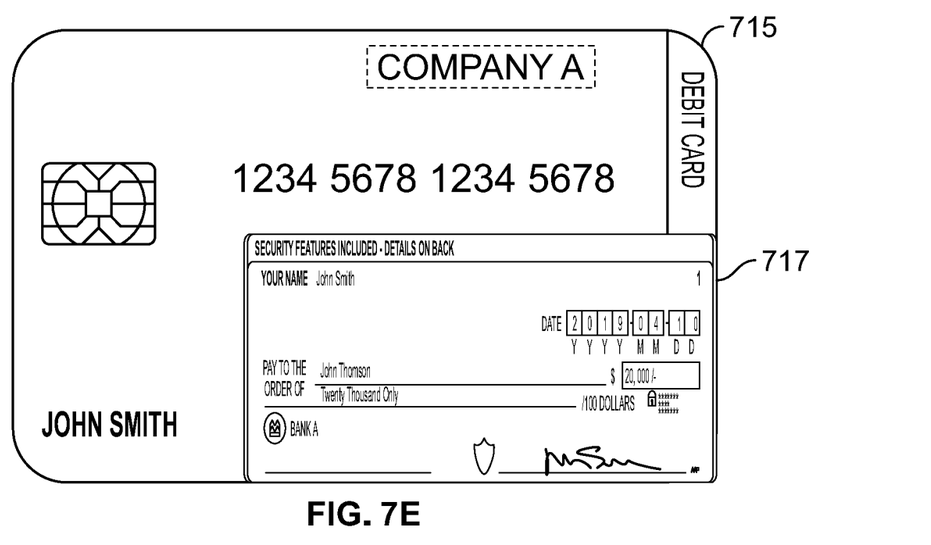
Figure 7F:
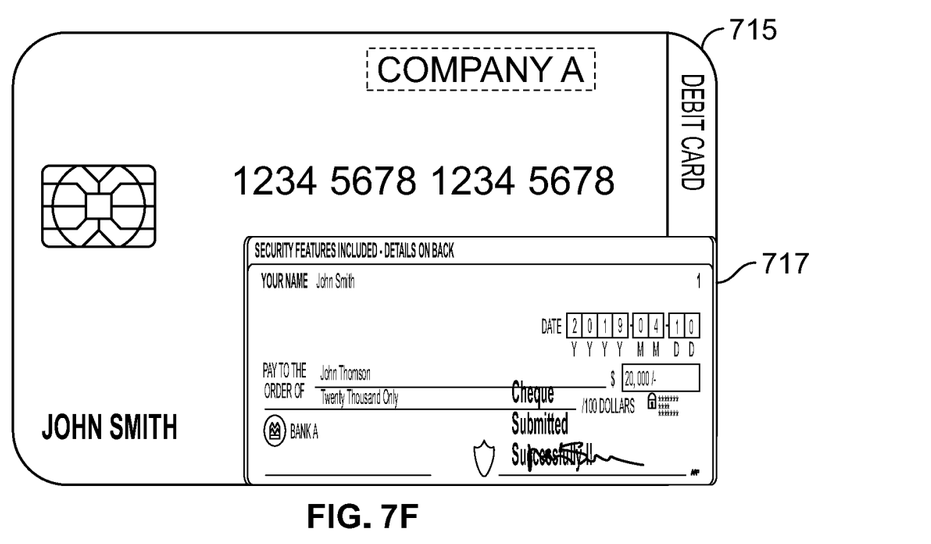

FIG. 7E shows smart card 715 displaying a revised document. The document may have been revised based on the recommended revisions. The document may have been revised manually. In some embodiments, the document may have been revised digitally by the smart card itself. The revised document may be ready for submission. The smart card may be configured to execute the submission. Submission may be executed after authorization of a user. FIG. 7F shows smart card 715 displaying a message that the document was submitted successfully.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for an augmented reality (AR)-assisted smart card for secure and accurate revision and/or submission of sensitive documents are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart card configured to leverage augmented reality (AR) technology to securely and accurately revise and/or submit sensitive documents, the smart card comprising a metal and/or plastic housing, said housing having dimensions that conform to the ISO/IEC 78101D-1 standard, said dimensions being no greater than 86 millimeters X 54 millimeters X 0.8 millimeters, said smart card comprising:
   a microprocessor;
   a display screen;
   two or more sensors, said sensors comprising:
      a camera; and
      a microphone and/or a tactile sensor;
   a power source for the microprocessor, the display screen, and the sensors;
   a wireless communication element configured to provide wireless communication between the smart card and a central system; and
   a non-transitory memory storing computer-executable instructions, that, when run on the microprocessor, are configured to:
      capture, via the camera, an image of a document, said document comprising a plurality of fields;
      process the image of the document via an image processing module and/or a text processing module;
      compute, for one or more of the fields, a recommended input;
      compare, for the one or more fields, the recommended input with an actual input;
      when the recommended input is more than a threshold difference apart from the actual input, generate a recommended revision;
      display an AR image of the document on the display screen, said AR image comprising the image of the document augmented with the recommended revisions;
      when no recommended revisions are generated, and authorization is received via the microphone and/or the tactile sensor, submit the document to the central system via the wireless communication element;
   wherein:
      the document comprises a personal bank check or a form to execute a transaction,
      the one or more fields comprise:
         a name field;
         an account number field;
         a date field;
         an address field;
         a monetary amount field; and/or
         a signature field; and
      the smart card is further configured to verify a monetary amount in the monetary amount field, and, to verify the monetary amount, the smart card is configured to:
         query the central system, via the wireless communication element, for an account balance associated with the smart card;
         when the monetary amount is greater than a maximum amount, said maximum amount that is a threshold amount below the account balance, the recommended revision generated for the monetary amount field comprises the maximum amount and/or a message indicating the account balance; and
         when the monetary amount field is blank, the recommended revision generated for the monetary amount field comprises a message indicating the account balance.

2. The smart card of claim 1, further configured to:
   virtually create a revised document that is based on the AR image of the document; and
   when authorization is received via the microphone and/or the tactile sensor, to submit the revised document to the central system via the wireless communication element.

* * * * *